(12) United States Patent
Kangas

(10) Patent No.: US 7,580,522 B2
(45) Date of Patent: Aug. 25, 2009

(54) DIGITAL VIDEO BROADCASTING RECEIVER

(75) Inventor: Mauri Kangas, Paimio (FI)

(73) Assignee: Nokia Corporation, Espoo (FI)

( * ) Notice: Subject to any disclaimer, the term of this patent is extended or adjusted under 35 U.S.C. 154(b) by 762 days.

(21) Appl. No.: 10/510,662

(22) PCT Filed: Apr. 4, 2003

(86) PCT No.: PCT/EP03/03599

§ 371 (c)(1),
(2), (4) Date: Oct. 7, 2004

(87) PCT Pub. No.: WO03/085985

PCT Pub. Date: Oct. 16, 2003

(65) Prior Publication Data

US 2005/0152546 A1    Jul. 14, 2005

(30) Foreign Application Priority Data

Apr. 11, 2002  (GB)  ................................. 0208373.1

(51) Int. Cl.
*H04N 7/167* (2006.01)
(52) U.S. Cl. ...................... 380/210; 380/212; 380/238; 713/168; 709/236; 370/509; 370/536; 725/151
(58) Field of Classification Search ................. 380/210, 380/212
See application file for complete search history.

(56) References Cited

U.S. PATENT DOCUMENTS

| | | | |
|---|---|---|---|
| 5,345,316 A | | 9/1994 | Ozaki et al. |
| 5,726,989 A | * | 3/1998 | Dokic ........................ 370/509 |
| 6,157,719 A | * | 12/2000 | Wasilewski et al. ......... 380/210 |
| 6,263,017 B1 | * | 7/2001 | Miller ......................... 375/222 |
| 6,356,212 B1 | * | 3/2002 | Lyons et al. .................. 341/60 |

(Continued)

FOREIGN PATENT DOCUMENTS

WO    WO 01/43444 A2    6/2001

(Continued)

OTHER PUBLICATIONS

I. Okoth, et al., "DVB-CI: Gateway to Truly Interactive Multimedia Environment," International Broadcasting Convention, Sep. 12-16, 1997, Conference Publication No. 447, 1997, pp. 465-469.

(Continued)

*Primary Examiner*—Kambiz Zand
*Assistant Examiner*—Yonas Bayou
(74) *Attorney, Agent, or Firm*—Locke Lord Bissell & Liddell LLP

(57) ABSTRACT

A digital video broadcasting receiver comprising a first input for receiving a first transport stream of data (TS#1) and a second input for receiving a second transport stream of data (TS#2), each transport stream comprising a plurality of packets and each packets having a header including a packet identifier PID. A de-scrambling device (12) receives packets of a transport stream for de-scrambling. A router (20) is arranged to pass packets alternately from the first TS#1 and the second TS#2 transport streams to the de-scrambling device 12 and to pass packets alternately to a first a second output, so restoring the first and second transport streams of data in a descrambled form.

26 Claims, 3 Drawing Sheets

U.S. PATENT DOCUMENTS

| | | | |
|---|---|---|---|
| 6,516,412 B2* | 2/2003 | Wasilewski et al. | 713/168 |
| 6,532,256 B2* | 3/2003 | Miller | 375/222 |
| 6,560,340 B1* | 5/2003 | Akins et al. | 380/239 |
| 6,948,186 B1* | 9/2005 | Brosey | 725/151 |
| 7,088,732 B2* | 8/2006 | Min | 370/428 |
| 7,298,846 B2* | 11/2007 | Bacon et al. | 380/212 |
| 2002/0101991 A1* | 8/2002 | Bacon et al. | 380/212 |
| 2003/0169783 A1* | 9/2003 | Coffin et al. | 370/536 |
| 2003/0172177 A1* | 9/2003 | Kersley et al. | 709/236 |
| 2005/0152546 A1* | 7/2005 | Kangas | 380/210 |

FOREIGN PATENT DOCUMENTS

| | | | |
|---|---|---|---|
| WO | WO 01/97526 A1 | 12/2001 | |

OTHER PUBLICATIONS

O.W. Bungum, "Transmultiplexing, Transcontrol And Transscrambling of MPEG-2/DVB Signal," International Broadcasting Convention, Sep. 12-16, 1996, Conference Publication No. 428, 1996, pp. 288-293.

D. Biere, "A Flexible and Modular Approach for Transmission of Digital TV and for Interactive Services," International Broadcasting Convention, 1995, pp. 195-201, together with IEEE Xplore Abstract/Citation of said paper.

Search Report of priority UK Application No. GB 0208373.1, Date of Search: Nov. 13, 2002.

PCT International Search Report (as published), International Application No. PCT/EP03/03599, Date of Completion of Search—Dec. 15, 2003.

* cited by examiner

DIGITAL VIDEO BROADCASTING RECEIVER

This invention relates to the de-scrambling of multiple multimedia streams, e.g. Digital Video Broadcasting (DVB) streams, originating from several sources. The invention provides a sophisticated and cost-effective way of implementation. The field of the invention is particularly suitable for use in applications which have a demand for de-scrambling multiple DVB streams, especially when so called Common Interface Module(s) are included.

The main driver for digital video broadcasting has been the Digital Video Broadcasting project organised by the European Broadcasting Union. In 1995 a set of standards was published as a result of the DVB project, which standards define a Digital Video Broadcasting system. These standards have been adopted on a wide scale globally. DVB is based on the International Standard ISO 13818 (known as MPEG2). MPEG2 defines a coding scheme for audio and video data and also defines a multiplexing standard (ISO 13818-1) which allows for the combination of many video, audio and/or data streams into one single data stream (also known as a transport stream). Thus many different programs may be multiplexed into a single transport stream. For instance, say a video program tends to require a data rate of 2-9 Mbit/s, this means that 4-18 video programs may be multiplexed into a single transport stream of around 38 Mbit/s.

Digital video broadcasting systems are known in which conditional access (CA) is provided. This means that access to a service is controlled, for instance by scrambling the transmitted signal. In Digital Video Broadcasting systems there is a demand for simultaneous handling of multiple multimedia streams.

European standard EN 50221 "Common Interface Specification for Conditional Access and other Digital Video Broadcasting Decoder Applications" defines a common interface between a host (e.g. a digital set-top-box (STB)) and the scrambling/de-scrambling and CA applications, known generically as a Common Interface Module (CI module). The CI module de-scrambles those DVB streams that have been secured against unauthorized viewing using a certain Conditional Access System (CA system). Conventionally CA systems are implemented so that each CA system has its own proprietary part, which has its own implementation in the system. For example, if four different CA systems are used in the DVB environment and the STB is to de-scramble services secured by all four of the CA systems, the STB must contain an implementation for each of those proprietary parts. Currently EN 50221 requires that each transport stream is passed sequentially through all the CI modules attached to a receiver.

Usually the proprietary parts of the CA system reside in the software and in the internal implementation of the hardware. In the case of a Common Interface Module, the common interface of the STB is standardized as well as the de-scrambling function and the mechanism to carry the CA messages, but the implementation itself and the possible use of a Smart Card is proprietary.

This invention is directed to the solution of how DVB streams from different sources may be de-scrambled simultaneously.

In accordance with the invention there is provided a method of managing data presented to and received from a de-scrambling device, the method comprising receiving at least a first and a second data stream, each data stream comprising a plurality of packets and each packet having a header including a packet identifier, alternately passing data from each data stream to a de-scrambling device, receiving de-scrambled packets from the de-scrambling device and alternately passing data to at least a first and a second output, so restoring at least the first and second data streams in a de-scrambled form.

Thus a receiver, and in particular a single CI module, has the functionality to de-scramble at least two transport streams of data at the same time. This is of particular use in Digital Video Broadcasting where a user may wish to watch one program on one TV set and either watch another TV program on a different TV set or record another TV program. The invention also allows for more than two data streams to be handled in this manner, for instance three data streams may be received and data from each data stream passed alternately to the de-scrambling device.

Preferably the method comprises passing alternately a single packet from each data stream to a de-scrambling device, and receiving de-scrambled packets from the de-scrambling device and alternately passing a single packet to a first output and a single packet to a second output, so restoring the first and second data streams in a de-scrambled form.

At least one packet identifier of the packets of one of the data streams may be modified before being passed to the de-scrambling device. This avoids the problem faced when two transport streams from two separate sources have the same identifiers in the transport streams. Modification of the packet identifiers may only be necessary if one or more of the packet identifiers of the first transport are the same as corresponding packet identifiers of the second transport stream. Prior to passing packets to the de-scrambling device the packet identifiers of the data streams may be compared with each other. If the packer identifiers of the data streams are the same, the packet identifiers of at least one data stream may be modified.

Preferably the data streams include program specific information and the program specific information is read from the data streams prior to passing packets to the de-scrambling device.

The invention has particular applicability to data streams that conform to ISO 13818 and, in this case, the packet identifiers are PID as defined in ISO 13818. Preferably the interface with the de-scrambling device conforms to European Standard EN50221.

Some of the packets from one or more data streams may bypass the de-scrambling device. These bypassed packets may be packets that are not required by a viewer or which do not require de-scrambling.

In a preferred embodiment of the invention, the packets from first and second data streams are passed to the de-scrambling device on one of the rising or falling edges of a clock signal respectively and the de-scrambled packets being received from the de-scrambling device on one of the rising or falling edges of a clock signal respectively.

Preferably the data streams are digital video broadcasting transport streams that comply with the Digital Video Broadcasting standard.

In a second aspect of the invention there is provided a receiver comprising a first input for receiving a first data stream and a second input for receiving a second data stream, each data stream comprising a plurality of packets and each packet having a header including a packet identifier, a de-scrambling device for receiving packets of a data stream for de-scrambling, a first and second output for outputting de-scrambled data streams, and a router arranged to pass data alternately from the first and the second data streams to the de-scrambling device and to receive de-scrambled packets from the de-scrambling device and to pass data alternately to a first and a second output, so restoring the first and second data streams in a de-scrambled form.

Preferably the router is arranged to pass alternately a single packet from the first data stream and a single packet from the second data stream.

The router may be arranged to modify at least one packet identifier of the packets of a data stream before passing the data for that data stream to the de-scrambling device and/or to compare the packet identifiers of the first data stream with the packet identifiers of the second data stream prior to passing packets to the de-scrambling device.

The data streams may include program specific information, the router being arranged to read the program specific information from the data streams prior to passing packets to the de-scrambling device.

The invention has particular application to data streams that conform to ISO 13818 (in which the packet identifiers are PID as defined in ISO 13818) and/or the interface with the de-scrambling device conforms to European Standard EN50221. The receiver may be a digital video broadcasting receiver.

Preferably the receiver is arranged to allow some of the packets from the first and/or second data stream to bypass the de-scrambling device.

The packets from the first and second data streams may be passed to the de-scrambling device on one of the rising or falling edges of a clock signal respectively and/or the de-scrambled packets may be received from the de-scrambling device on one of the rising or falling edges of a clock signal respectively.

In a further aspect of the invention there is provided a router for routing packets of a first data stream and a second data stream to and from a de-scrambling device, each data stream comprising a plurality of packets and each packet having a header including a packet identifier, the router being arranged to pass data alternately from the first and the second data streams to the de-scrambling device and to receive de-scrambled packets from the de-scrambling device and to pass data alternately to a first and a second output, so restoring the first and second data streams in a de-scrambled form.

In a further aspect of the invention there is provided a de-scrambling device comprising;

an input for receiving a clock signal, a first and a second input buffer, a de-scrambling module and first and second output buffers, the de-scrambling device being arranged to clock input data into the first and second input buffers on one of the rising and falling edge of the clock signal respectively and to clock data out of the output buffers on one of the rising and falling edge of the clock signal respectively. The de-scrambling device preferably conforms to a Digital Video Broadcasting standard.

In a further aspect of the invention there is provided a computer program product which, when said product is loaded, causes a computer to execute procedure to manage data presented to and received from a de-scrambling device, the computer program product comprising computer program code to make the computer execute procedure to receive at least a first and a second data stream, each data stream comprising a plurality of packets and each packet having a header including a packet identifier, to pass data alternately from each data stream to a de-scrambling device, and to receive de-scrambled packets from the de-scrambling device and to pass data alternately to at least a first and a second output, so restoring the first and second data streams in a de-scrambled form.

The computer program product may further comprise computer program code to make the computer execute procedure to pass alternately a single packet from each data stream to a de-scrambling device, and to receive de-scrambled packets from the de-scrambling device and to pass alternately a single packet to a first output and a single packet to a second output, so restoring the first and second data streams in a de-scrambled form.

The invention will now be described, by way of example only, with reference to the accompanying drawings, in which.

Figure 1:
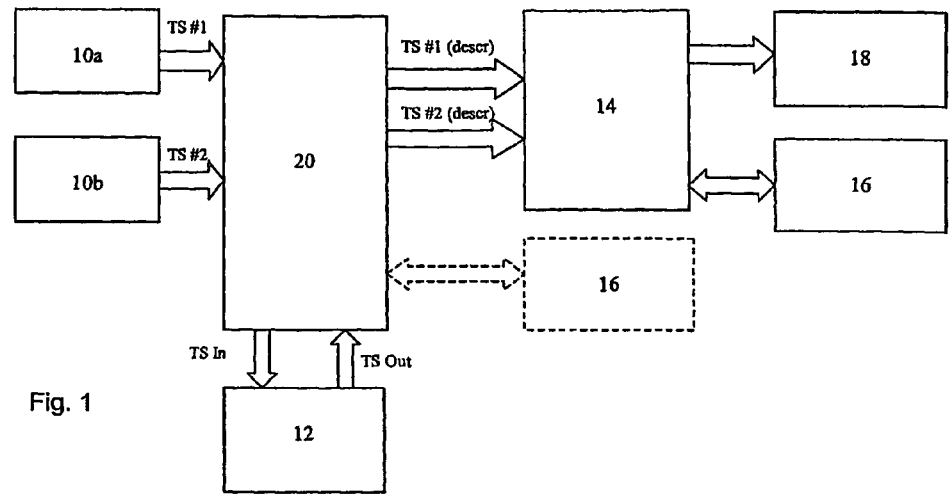
FIG. 1 shows a first embodiment of a multimedia receiver in accordance with the invention.

As DVB generally uses the MPEG2 coding scheme (ISO 13818) for the video and audio data, the invention will be described with reference to this data format. An MPEG2 Transport Stream (TS) includes a sequence of Transport Packets (TS Packets). Each TS Packet is fixed in length and has a minimum 4-byte header and a minimum 184-byte payload. The TS header includes a Packet Identifier (PID). During formation of the transport streams from audio and/or video data, additional packets are inserted containing tables needed to de-multiplex the transport streams. These tables are collectively known as Program Specific Information (PSI).

The following table illustrates the contents and values of the PID values used in the PSI information tables of MPEG2.

TABLE 1

The Contents and PIDs of the PSI Tables

| Structure Name | Stream Type | Reserved PID # | Description |
|---|---|---|---|
| Program Association Table (PAT) | ITU-T Rec. H.222.0/ ISO/IEC 13818-1 | 0x00 | Associates Program Number and Program Map Table PID |
| Program Map | ITU-T Rec. H.222.0/ | Assigned in | Specifies PID values for |

TABLE 1-continued

The Contents and PIDs of the PSI Tables

| Structure Name | Stream Type | Reserved PID # | Description |
|---|---|---|---|
| Table (PMT) | ISO/IEC 13818-1 | the PAT | components of one or more programs |
| Network Information Table (NIT) | Private | Assigned in the PAT | Physical network parameters such as FDM frequencies. Transponder Numbers, etc. |
| Conditional Access Table (CAT) | ITU-T Rec. H.222.0/ ISO/IEC 13818-1 | 0x01 | Associates one or more (private) EMM streams each with a unique PID value |

The PID is a unique identifier. For a given program, every video and audio stream as well as each PSI table has a unique PID. To reconstruct a program from all its video, audio and table components, it is necessary to ensure that the PID assignment is done correctly and that there is consistency between the PSI table contents and the associated video and audio streams.

The Program Association Table (PAT) contains information on all programs in that particular multiplex, which is identified by the transport_stream_id. PAT contains a list of program_numbers and their respective program_map_PIDs, which refer to the Program Identification (PID) of the respective Program Map Tables (PMT). The network_PID identifies a special table, Network Information Table (NIT), which contains information on the network specific parameters. NIT is not relevant to the understanding of the current invention. PAT is identified with the PID value 0x0000 and the table_id value 0x00.

TABLE 2

The Program Association Table (PAT)

| Syntax | No. of bits | Mnemonic |
|---|---|---|
| program_association_section( ) { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   for (i=0; i<N;i++) { | | |
|     program_number | 16 | uimsbf |
|     reserved | 3 | bslbf |
|     if(program_number == '0') { | | |
|       network_PID | 13 | uimsbf |
|     } | | |
|     else { | | |
|       program_map_PID | 13 | uimsbf |
|     } | | |
|   } | | |
|   CRC_32 | 32 | rpchof |
| } | | |

The Program Map Table (PAT, TS_program_map_section) below contains, for example, a list of all elementary streams which belong to the program identified by program_number. It will contain also a list of descriptors, which are mainly used to describe the type and nature of the elementary stream components. One of the most important descriptors is the CA_descriptor, which is explained in the following paragraphs. The PID value of the PMT is indicated in the PAT, but the table_id value of the PMT is 0x02.

TABLE 3

The Program Map Table (PMT)

| Syntax | No. of bits | Mnemonic |
|---|---|---|
| TS_program_map_section( ) { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i=0; i<N; i++) { | | |
|     descriptor( ) | | |
|   } | | |
|   for (i=0;i<N1;i++) { | | |
|     stream_type | 8 | uimsbf |
|     reserved | 3 | bslbf |
|     elementary_PID | 13 | uimsnf |
|     reserved | 4 | bslbf |
|     ES_info_length | 12 | uimsbf |
|     for (i=0; i<N2; i++) { | | |
|       descriptor( ) | | |
|     } | | |
|   } | | |
|   CRC_32 | 32 | Rpchof |
| } | | |

The Conditional Access Table (CAT) contains a list of descriptors, and the most interesting in this invention is the CA_descriptor, which is explained in the following paragraph. The CAT is transmitted with the PID value 0x0001 and table_id value 0x01.

TABLE 4

The Conditional Access Table (CAT)

| Syntax | No. of bits | Mnemonic |
|---|---|---|
| CA_section( ) { | | |
|   table_id | 8 | Uimsbf |
|   section_syntax_indicator | 1 | Bslbf |
|   '0' | 1 | Bslbf |
|   reserved | 2 | Bslbf |

TABLE 4-continued

The Conditional Access Table (CAT)

| Syntax | No. of bits | Mnemonic |
|---|---|---|
| section_length | 12 | uimsbf |
| reserved | 18 | bslbf |
| version_number | 5 | uimsbf |
| current_next_indicator | 1 | bslbf |
| section_number | 8 | uimsbf |
| last_section_number | 8 | uimsbf |
| for (i=0; i<N;i++) { | | |
|    descriptor( ) | | |
| } | | |
| CRC_32 | 32 | rpchof |
| } | | |

In the following table is shown the structure of the CA_descriptor. When the CA descriptor is found in the PMT (table_id=0x02), the CA_PID points to packets containing program related access control information, such as Entitlement Control Messages (ECMs). Its presence as program information indicates applicability to the entire program. In the same case, its presence as extended Elementary Stream (ES) information indicates applicability to the associated program element.

TABLE 5

The Structure of the Conditional Access Descriptor

| Syntax | No. of bits | Mnemonic |
|---|---|---|
| CA_descriptor( ) { | | |
|   descriptor_tag | 8 | Uimsbf |
|   descriptor_length | 8 | Uimsbf |
|   CA_system_ID | 16 | uimsbf |
|   reserved | 3 | bslbf |
|   CA_PID | 13 | uimsbf |
|   for (i=0; i<N; i++) { | | |
|     private_data_byte | 8 | uimsbf |
|   } | | |
| } | | |

When the CA_descriptor is located in the CAT it is used for an Entitlement Management Message (EMM).

One of the descriptors used in the Elementary Stream (ES) information field of the PMT table is the private_data_indicator_descriptor, which is reserved for private use. It is illustrated in the table below.

TABLE 6

Private Data Indicator Descriptor

| Syntax | No. of bits | Identifier |
|---|---|---|
| Private_data_indicator_descriptor( ) { | | |
|   descriptor_tag | 8 | Uimsbf |
|   descriptor_length | 8 | Uimsbf |
|   private_data_indicator | 32 | Uimsbf |
| } | | |

The descriptor_tag can have values from 64 to 255. This information and the stream_type in the ES information field can be used to separate the private data (stream_type value 128-255) from other data packets in the TS stream.

One example of an embodiment of a multimedia receiver according to the invention is shown in FIG. 1. The arrangement depicted in FIG. 1 can be used in applications for instance which require simultaneous recording of a digital stream residing on one physical frequency, while another digital stream on another physical frequency is to be decoded and watched. The receiver shown has two front-ends 10a, 10b. A front-end 10 may, for example, be a cable front-end, a satellite front-end or a terrestrial front-end as known in the art. Transport streams (TS) to be de-scrambled by the CI module are selected in a conventional manner by the front-end, which includes demodulating and error correction functionality.

A TS Router 20 routes and/or multiplexes the two transport streams TS #1 and TS #2 via a CI module 12, if appropriate, to a demultiplexer 14. This arrangement allows the watching and/or recording of two different transport streams or programs from which the scrambling is removed by the CI Module 12.

A recording device 16 may be connected to the demultiplexer 14 so that an incoming transport stream is de-scrambled before being fed to the recording device 16. For the purposes of content protection, the DVB stream which is routed to the recording device may be scrambled again in the demultiplexer.

Alternatively the recording device 16 may be connected directly to the TS Router 20 so that those parts of the transport stream which are routed to the recording device 16 can be routed there scrambled or de-scrambled via the CI module. If routed to the recording device in a scrambled format, when the recorded stream is played back, it is routed via the TS Router 20 to the CI Module 12 and further to the demultiplexer 14.

When recording, the recording device 16 is treated as one of the output ports of the TS router 20. When the recording device is running in the playback mode it is acting as an input port to the TS router. This means that the recording device interface is seen as a bi-directional interface containing both the input and output port functionality.

The output of the demultiplexer 14 is connected to a video-audio decoder 18 for play-back to a user.

Figure 2:
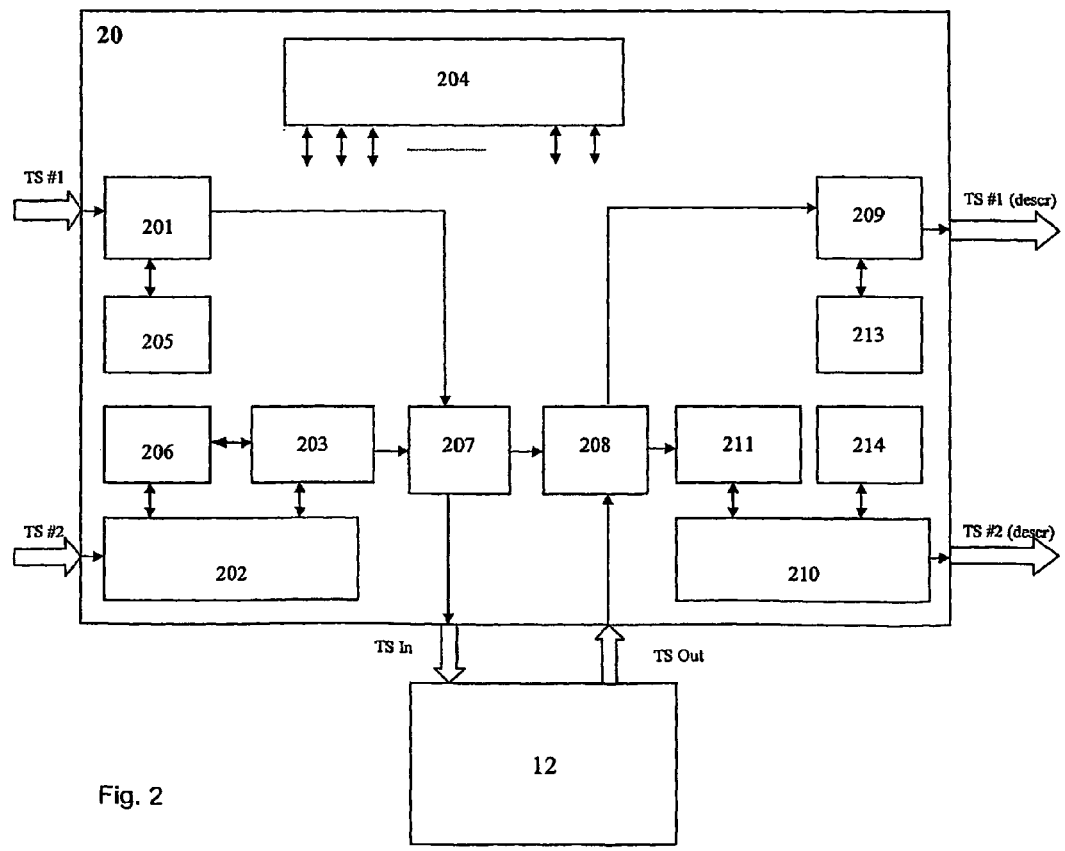
FIG. 2 shows a first embodiment of a router according to the invention.

One embodiment of a TS Router 20 is depicted in FIG. 2. For simplicity, the example shown in FIG. 2 has two input and two output streams, but more complicated implementations can also be accomplished based on the same principle. For instance there may be more than two input streams and/or more or fewer than two output streams. The router routes data from the front-ends 10 to the CI 12 module if required and onto the demultiplexer 14. Thus the CI Module 12 is used as a de-scrambling engine for the two input streams.

In the two input/two output case as shown in FIG. 2, the router 20 passes packets from the first transport stream TS#1 into a first Input Buffer 201 and packets from the second transport stream TS#2 into a second Input Buffer 202, respectively.

Data is taken from the two input streams alternately by the CI Input Selector 207 and presented to the CI module 12. Thus data (one or more packets) from TS#1 is passed to the CI module 12, followed by data (one or more packets) from TS#2, followed by data from TS#1, followed by data from TS#2 and so on. When the selector 207 tries to pass a packet of data from a buffer 201 or 202 to the CI module 12, if there is no data in buffer 201 or 202 at the time, the selector 207 may send a dummy packet to the CI module or stop the clock of the router or alter the status of a Data Valid flag to off.

The Main Control and Timing Block 204 generates the clock signals for the whole circuitry and the appropriate control signals to the different parts of the system.

The Input Buffer Control modules 205, 206 control the input buffer filling status and, together with the Main Control and Timing block 204, allocate TS packets from the input buffers to the CI Module 12 via the CI Input Selector 207.

The input stream TS#1 is routed to the CI Module 12 without any modifications, but the input stream TS#2 may contain the same PID values as TS#1, especially in the PSI information. If so, the PID values for TS#2 may be modified by a 'PID Value In-Exchange' block 203.

When two transport streams are combined into one transport stream as in the present case (for presentation to the CI module 12), this may result in a duplication of the pre-defined values of the PAT, CAT and PMT PIDs.

For the simultaneous de-scrambling of MPEG packets from two different transport streams which were scrambled under the control of the same source CA system, the EMM and ECM PID values are conventionally selected by the CA system to have different values and thus would not require any modification by the 'PID Value In-Exchange' block 203.

On the other hand, when two transport streams are scrambled under the control of different CA systems, the PID values of the video, audio, and data streams in the different TS streams may be allocated different PID values, but this is not always the case. If the PID values of the video, audio, and data streams in the different TS streams are allocated the same PID values by different CA systems, then many of the PID values of the video, audio and data streams belonging to the transport stream TS #2 are changed by the 'PID Value In-Exchange' block 203 before feeding to the CI Module 12. For instance, when the two TS streams are independent there may exist contradictions in the PID values of the video, audio, and data streams of each Transport Stream since the same PID values may have been used for both TS. Also the PID values of the Entitlement Management Message (EMM) and the Entitlement Control Message (ECM) could have the same PID values in the two different transport streams. (Usually the values of the ECM PID is located in the CA descriptor residing in the PMT and the EMM PID is located in the CA descriptor in the CAT.)

When the CI Input Selector is handling unscrambled packets they can be routed directly to the TS Output Selector 208 without clocking through the CI Module depending on the implementation.

The CI module 21 de-scrambles packets presented to it using the appropriate PAT, CAT, PMT etc. PID values.

The TS Output Selector 208 sorts out the TS packets arriving from the CI Module into the appropriate TS Output Buffer 209, 210. The TS packets flowing into the first TS Output Buffer 209 will be transferred from the TS Output Selector 208 without modification, but the TS packets to the second TS Output Buffer 210 have their PID values modified back to their original values, if they have been modified in the 'PID Value In-Exchange' block 203. This modification happens in the 'PID Value Out-Exchange' block 211.

The first Output Buffer Control 213 supervises and controls the filling status and mechanism of the first Output Buffer 209 in the same way as the second Output Buffer Control 214 for the second Output Buffer 210.

The contents of the Output Buffer 209 and Output Buffer 210 is clocked out in a constant bit stream fashion so that that the timing of the original bit stream will be maintained without the need to modify the contents of the PCR (Program Clock Reference) fields in the TS packets.

In the first embodiment of the invention, in which several TS streams are combined into one for feeding to the CI module, several modifications are made to the PID values of the TS packets within those TS streams.

The modification and other procedures in the PID Value-In Exchange module 203 can be carried out with the following steps (with the assumption that the TS stream TS #1 is kept unchanged through the processing):

Read in the PAT tables from all the TS input streams
    Study all the PMT PID values from all the PAT tables
    Read in all the PMT tables for all the different TS input streams
    Read the CAT tables from all TS input streams.
    (At this point the system has all the PID value information of all the incoming TS streams.)
    Modify the PAT PID values of the PAT tables, except in the TS #1, which will have PID value 0x0000.
    Modify all the PMT PID values in the PAT tables, except in the TS #1, if there is need for modification (e.g contradiction with other streams exist)
    Modify the PID values of the PMT tables, where necessary.
    Modify the PCR_PID values within the PMT tables if necessary.
    Modify the elementary_PID vales within the PMT tables in cases where the CA_descriptors indicate that the respective elementary stream is encrypted, otherwise the respective elementary stream packet will bypass the CI module directly to the respective output buffer. According to the indication from the private_data_indicator_descriptor (from the descriptor_tag or the stream_type value) those TS packets must be directed to the CI module.
    Modify the contents of the CA_descriptors within the PMT and CAT tables, if necessary.
    Modify the contents of the PID values of those elementary stream components, which are directed to the CI module. These PID value modifications must match with the modifications in the respective PMT tables.
    Forward to the CI module 12 the new PSI tables with the modified PID values. This may be done in any suitable manner e.g. by providing configuration information to the CI module or in dedicated data packets or in a specific dialog between the router and the CI module.

Operations to be carried out in the PID Value Out-Exchange block 211 are listed as follows:
    The original PAT, PMT and CAT tables must be returned to the respective transport streams.
    The PID values of the TS packets containing PCR values must be replaced with the original ones.
    All those TS packets containing service data (video, audio, data, etc.), the PID value of which has been modified in the PID Value In-Exchange block 203, must be modified back to their original values.

It is not necessary to modify the PAT PID to its original value because the individual TS can be separated from each other based on the transport_stream_id residing in the PAT table. The transport_stream_id parameter identifies the origin multiplex of the respective PAT table.

There are also some other implementation possibilities. One possible approach is as follows:
    Read in all the PAT, PMT and CAT tables from the incoming streams.
    Modify the PID values of the TS packets containing the EMMs and ECMs of the selected programs, if the PID values in the TS packets containing the EMM and ECM messages in the selected programs are carrying the same values. This happens in the PID Value In-Exchange block 203.
    Modify the PID values of the elementary streams belonging to the selected programs so that different elementary streams from different TS streams will not use the same PID values. This happens in the PID Value In-Exchange block 203.
    Communicate with the CI module 12 on the application level and give the required information in the form of CA PMT objects with the modified PID values. (European standard EN50221 includes the details of the CA PMT object communications between the CI module and the host.)

The TS packets containing the elementary streams and EMM & ECM messages of the selected programme are taken to the CI module. Everything else bypasses the CI module directly to the respective output buffers.

At the output side of the CI module, in the PID Value Out-Exchange block 211, the original PID values are returned to the appropriate TS packets coming from the CI module.

In some instances, the TS router may bypass the CI module for some of the TS data packets. For instance, say each TS has a data rate of 60 Mbits/sec and that the CI module can only handle 60 Mbits/sec. Thus, for two input transport streams, at least 60 Mbits/sec of the TS streams bypass the CI module. Only those packets of the transport stream that are required by a user need to be passed to the CI module. Thus, for instance, if a TS includes data for say 6 programs and a user only wishes to view or record one of the programs of the TS, then the CI input selector 207 needs to pass only the packets relating to the program to be viewed/recorded. Additionally, if a program to be viewed/watched is transmitted in an un-scrambled manner, then these packets may also bypass the CI module.

Other variations are also envisaged to feed two or more TS input streams through the CI module, where the de-scrambling of the selected programs will take place.

If the number of source and target TS streams is different and are to be directed as complete TS streams for further processing after the de-scrambling process in the CI module, further processing in the PAT, PMT and CAT tables and PID value exchange processing may be necessary. If the TS packets from different sources are to be demultiplexed into different service data (video, audio, data, ec.) after the CI module processing for a different number of targets, there may be no need for further modifications of the PAT, PMT and CAT tables or PID value exchange.

If there are three input streams to be de-scrambled at the same time, the CI input selector 207 alternately passes data from each of the transport streams e.g. a packet from TS#1, a packet from TS#2, a packet from TS#3, a packet from TS#1, a packet from TS#2, a packet from TS#3, and so on.

As discussed above, not all packets from a TS have to be presented to the CI module 12. Only those required by a user need to be presented. Thus packets #1, #2, #3 etc in each transport stream as presented to the CI module 12 by the CI input selector 207 do not have to occur consecutively within each TS. All that is necessary is for the CI input selector 12 to take data from each TS in turn.

When there are more than two input and output streams, the implementation is similar to the two input/output stream case, except that it becomes more complicated since more buffers and more complicated timing and control blocks are required and the bypass functionality becomes more complicated due to the multipath routing functionality.

Different amount of input and output ports makes the implementation more complicated, but the operations as described above, e.g. clocking the data to the CI module, bypassing some packets, controlling buffers and routing functionality, will remain basically the same in nature.

Figure 3:
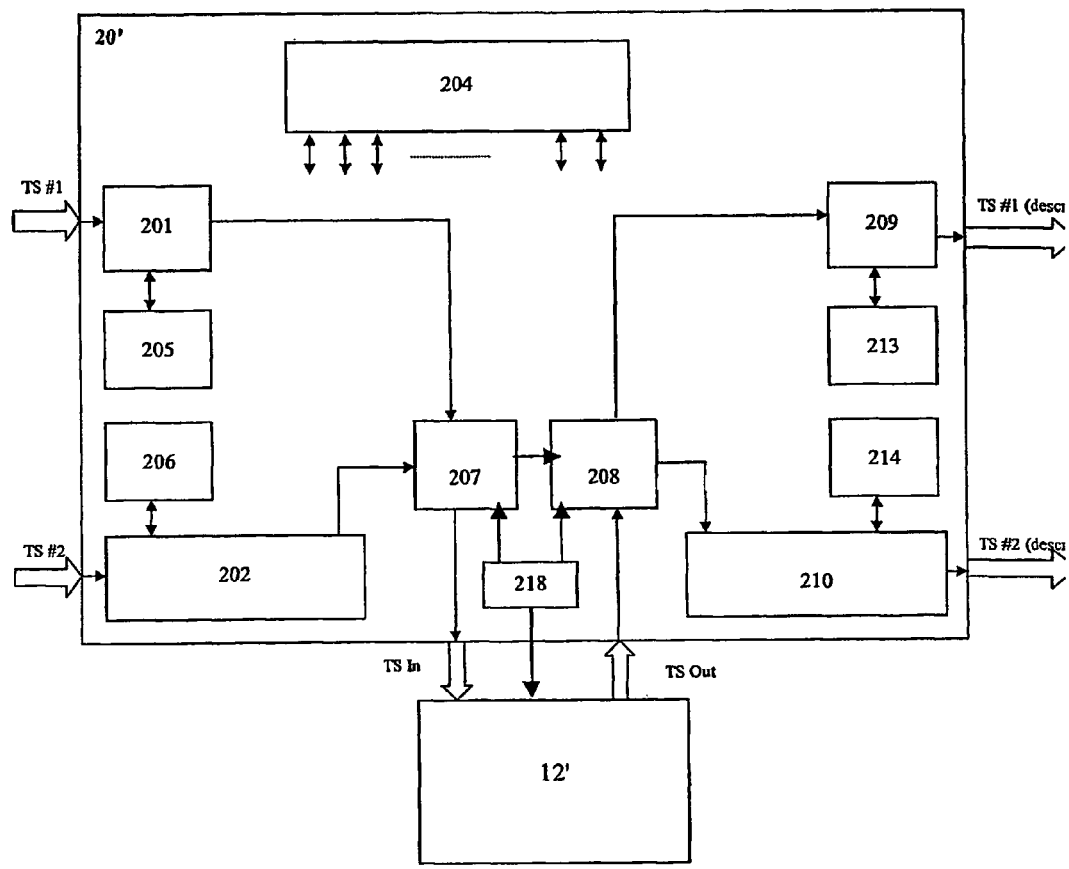
FIG. 3 shows a second embodiment of a router according to the invention.

In an alternative embodiment, when two TS input streams are feeding the system, a special clocking arrangement may be used, which would mean that there is no need to change the PID values in the incoming streams. An example of a second embodiment of a router to implement this is illustrated in FIG. 3.

In this particular implementation, the PID values in the TS input streams do not need to be changed. In the simplest form of the implementation both TS streams are routed through the CI module 12 without the need to bypass any packets. The router 20', as shown in FIG. 3, differs from that shown in FIG. 2 in that the 'PID Value In-Exchange' block 203 and the 'PID Value Out-Exchange' block 211 are omitted. The CI Input Selector 207 and the CI Output Selector 208 are controlled by a clocking system 218.

Figure 4:
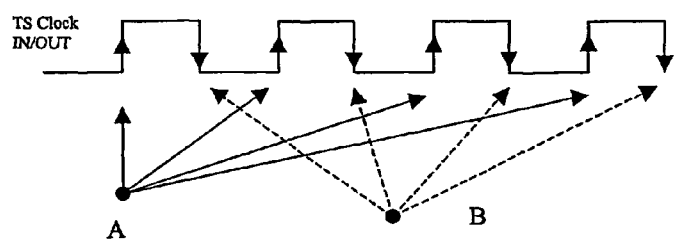
FIG. 4 shows an example of the clocking arrangement for use with the embodiment shown in FIG. 3.

The timing diagram of the clocking system is depicted in FIG. 4, where the rising edge of the TS clock (indicated by arrows labelled A) is used to clock in data of TS #1 from the first input buffer 201 and the falling edge (indicated by arrows B) is used to clock in data of TS #2 from the second input buffer 202 the TS #2. The operation of the CI module is clocked successively between TS#1 packets and TS#2 packets, both on its input and its output. Thus the rising edge of the TS clock (indicated by arrows labelled A) is used to clock out data for TS #1 from the CI module 12' to the first output buffer 209 and the falling edge (indicated by arrows B) is used to clock out data for TS #2 from the CI module 12' to the second output buffer 210.

Figure 5:
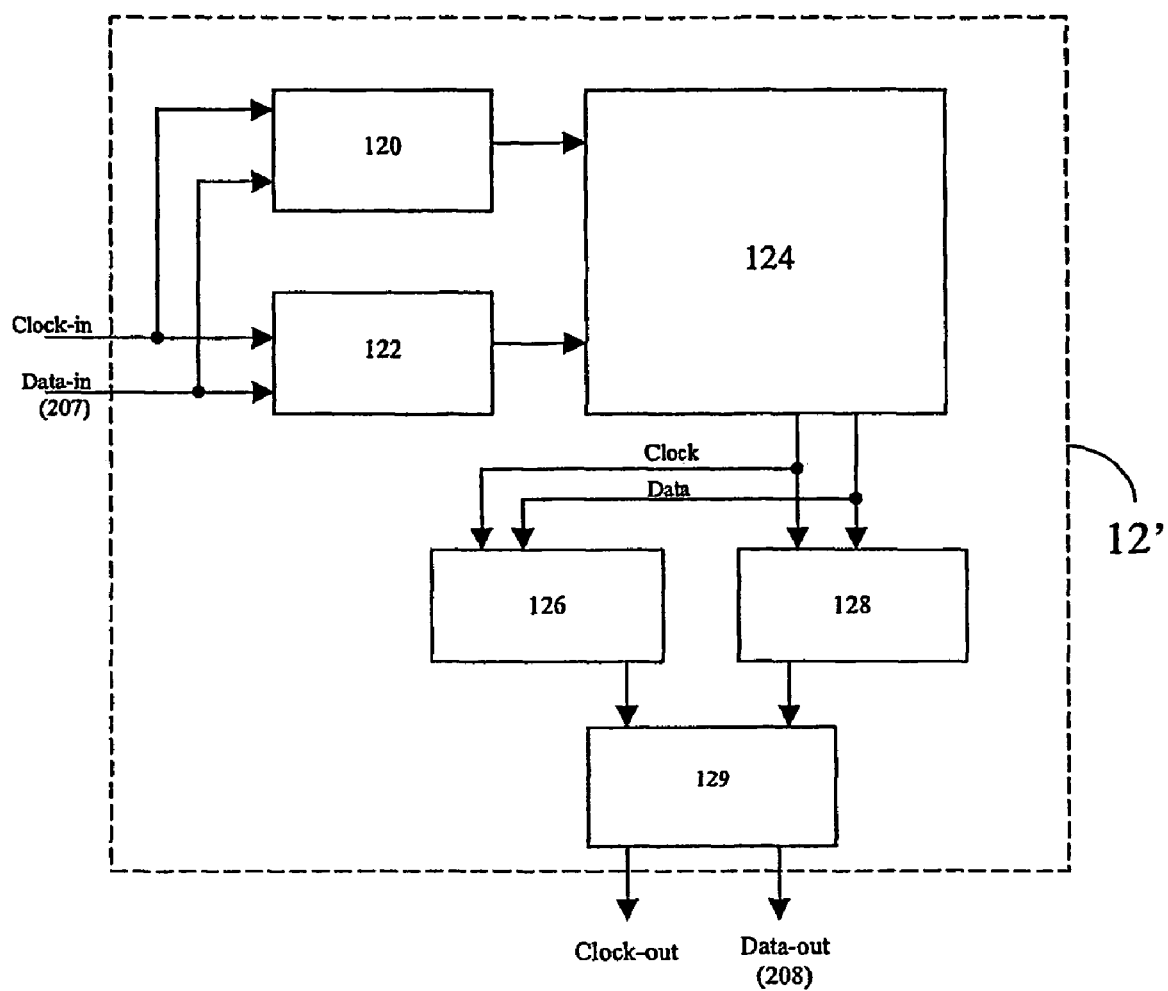
FIG. 5 shows an example of a modified CI module for use with the second implementation of the router shown in FIG. 3.

An example of a CI module to allow for this implementation is shown in FIG. 5. The CI Module includes a first input buffer 120 for storing packets received on the rising edge of a clock signal, a second input buffer 122 for storing packets received on the falling edge of a clock signal, a TS packet de-scrambler 124, a first output buffer 126 for storing packets for output on the rising edge of a clock signal, a second output buffer 128 for storing packets for output on the falling edge of a clock signal and a Data Selector and Output Clock Generator component 129. The input data, from CI Input Selector 207, is buffered into one or other of the buffers 120, 122 depending on whether the packet is received on the rising or falling edge of the incoming clock signal (Clock-in). The data is presented to the TS packet de-scrambler 124 one packet at a time and, depending on the filling status of the input buffers, the TS packet de-scrambler takes the next packet from the appropriate buffer 120,122.

After de-scrambling, the packets are loaded into the respective output buffer 126, 128. The output data selector 129 takes one byte (or packet) at a time from the output buffers, alternating between the buffers on the rising and falling edges of the generated output clock. If one of the output buffers does not have any complete packets in the buffer, a dummy packet is output instead.

Thus, in this arrangement, the CI module is switched on the rising and falling edge of the clock. The timing constraints in the timing of the clock might need to be tighter than specified in the Common Interface standard EN 50221. It is also possible with this implementation for the CI Input Selector 207 to send some of the packets direct to the TS Output Selector 208, so bypassing the CI Module 12' completely for those packets.

The special implementations of the CI module, which have been referred to above, mean that in effect there are two separate or functionally overlapping DVB de-scramblers. These de-scramblers take in data on the rising and falling edge, respectively, de-scramble it and clock out data on the falling and rising edge from different TS stream routes, respectively.

The PAT, CAT and PMT table handling is doubled and also both TS stream routes require their own key and PID storage for the two separate de-scrambling processes.

The arrangement of FIG. 3 is a more straightforward implementation than that shown in FIG. 2, but is limited to the two TS input streams if a single clock signal is used.

If the timing of EN 50221 is to be adhered to, then the implementation depicted in FIG. 2 is preferred, as it is possible to lower the traffic to the CI module 12 to a maximum of 60 Mbits/sec by bypassing the CI module for some packets. This implementation means that part of the TS streams bypass the CI module 12 thus limiting the amount of data which can be de-scrambled in the system.

The CA system and the CI Module may require some special implementation, especially in software if the CI Module has been initially designed in a sophisticated way. This implementation requires communication of the modified PID values of the PAT, CAT and PMT tables. If the whole contents of these tables have been modified to match the modified PID values in the TS stream to the CI Module, basically the CI Module requires the capability to capture the PAT, CAT and PMT tables with the modified PID values and the rest of the CA procedures can act accordingly.

The invention claimed is:

1. A method, comprising:
   receiving at least two data streams, each of the at least two data streams comprising a plurality of packets and each packet having a header including a packet identifier,
   generating a multiplexed data stream in a routing component, the multiplexed data stream comprising packets from the at least two data streams arranged in an alternating order;
   descrambling the multiplexed data stream using a single descrambling component distinct from the routing component, wherein the routing component sequentially routes packets from the multiplexed data stream to the single descrambling component in the alternating order;
   receiving, in the routing component, packets from the single descrambling component, the packets being received in a descrambled form and in accordance with the alternating order so that a descrambled multiplexed data stream is formulated; and
   outputting separate descrambled data streams from the routing component, the separate descrambled data streams being formed by demultiplexing the descrambled multiplexed data stream in the routing component.

2. The method according to claim 1 further comprising
   alternately passing a single packet from each data stream to the descrambling component, and
   receiving descrambled packets from the descrambling component and alternately passing a single packet to a first output and a single packet to a second output, so restoring the first and second data streams in a descrambled form.

3. The method according to claim 1 wherein at least one packet identifier of the packets of one of the data streams is modified before being passed to the descrambling component.

4. The method according to claim 1 wherein prior to passing packets to the descrambling component the packet identifiers of the data streams are compared with each other.

5. The method according to claim 1 wherein the data streams include program specific information, wherein the program specific information is read from the data streams prior to passing packets to the descrambling component.

6. The method according to claim 1 wherein each data stream conforms to ISO 13818 and the packet identifiers are PID as defined in ISO 13818.

7. The method according to claim 1 wherein the interface with the descrambling component conforms to European Standard EN50221.

8. The method according to claim 1 wherein some of the packets from one or more data streams bypass the descrambling component.

9. The method according to claim 1 wherein the packets from first and second data streams are passed to the descrambling component on one of the rising or falling edges of a clock signal respectively.

10. The method according to claim 9 wherein the descrambled packets are received from the descrambling component on one of the rising or falling edges of a clock signal respectively.

11. The method according to claim 1 wherein the data streams are digital video broadcasting transport streams.

12. The method according to claim 11 wherein the transport streams comply with the Digital Video Broadcasting standard.

13. An apparatus, comprising:
    a first input configured to receive a first data stream and a second input configured to receive a second data stream, each data stream comprising a plurality of packets and each packet having a header including a packet identifier,
    a descrambling device configured to descramble packets of a multiplexed data stream,
    first and second outputs configured to output descrambled data streams, and
    a router configured to generate the multiplexed data stream comprising packets from the first and second data streams arranged in an alternating order, sequentially route packets from the multiplexed data stream to the descrambling device in the alternating order and to receive descrambled packets from the descrambling device, the packets being received in a descrambled form and in accordance with the alternating order so that a descrambled multiplexed data stream is formulated,
    the router configured to output separate descrambled data streams to the first and second outputs, the separate data streams being formed by demultiplexing the descrambled multiplexed data stream.

14. The apparatus according to claim 13 the router is configured to pass alternately a single packet from the first data stream and a single packet from the second data stream.

15. The apparatus according to claim 13 wherein the router is configured to modify at least one packet identifier of the packets of a data stream before passing the data for that data stream to the descrambling device.

16. The apparatus according to claim 13 wherein the router is configured to compare the packet identifiers of the first data stream with the packet identifiers of the second data stream prior to passing packets to the descrambling device.

17. The apparatus according to claim 13 wherein the data streams include program specific information, the router being configured to read the program specific information from the data streams prior to passing packets to the descrambling device.

18. The apparatus according to claim 13 wherein each data stream conforms to ISO 13818 and the packet identifiers are PID as defined in ISO 13818.

19. The apparatus according to claim 13 wherein the interface with the descrambling device conforms to European Standard EN50221.

20. The apparatus according to claim 13 wherein the apparatus is a digital video broadcasting receiver.

21. The apparatus according to claim 13 further configured to allow some of the packets from the first and/or second data stream to bypass the descrambling device.

22. The apparatus according to claim 13 wherein the packets from the first and second data streams are passed to the descrambling device on one of the rising or falling edges of a clock signal respectively.

23. The apparatus according to claim 22 wherein the descrambled packets are received from the descrambling device on one of the rising or falling edges of a clock signal respectively.

24. An apparatus comprising:
  a router configured to generate a multiplexed data stream, the multiplexed data stream comprising packets from a first data stream and a second data stream arranged in an alternating order;
  the router being configured to sequentially route packets from the multiplexed data stream to a descrambling device in the alternating order, to receive descrambled packets from the descrambling device, the packets being received in a descrambled form and in accordance with the alternating order so that a descrambled multiplexed data stream is formulated and to output separate descrambled data streams to a first and a second output, the separate descrambled data streams being formed by demultiplexing the descrambled multiplexed data stream,
  wherein each data stream comprises a plurality of packets, each packet having a header including a packet identifier.

25. A computer program product comprising a computer readable medium having computer readable program code embodied in said medium, comprising:
  a computer readable program code configured to receive at least two data streams, each data stream comprising a plurality of packets and each packet having a header including a packet identifier,
  a computer readable program code configured to generate a multiplexed data stream in a routing component, the multiplexed data stream comprising packets from the at least two data streams arranged in an alternating order,
  a computer readable program code configured to descramble the multiplexed data stream using a single descrambling component distinct from the routing component, wherein the routing component sequentially routes packets from the multiplexed data stream to the single descrambling component in the alternating order;
  a computer readable program code configured to receive, in the routing component, packets from the single descrambling component, the packets being received in a descrambled form and in accordance with the alternating order so that a descrambled multiplexed data stream is formulated; and
  a computer readable program code configured to output separate descrambled data streams from the routing component, the separate descrambled data streams being formed by demultiplexing the descrambled multiplexed data stream in the routing component.

26. The computer program product of claim 25, further comprising:
  a computer readable program code configured to pass alternately a single packet from each data stream to the descrambling component, and to receive descrambled packets from the descrambling component and to pass alternately a single packet to a first output and a single packet to a second output, so restoring the first and second data streams in a descrambled form.

* * * * *